(12) United States Patent
Jones et al.

(10) Patent No.: US 10,505,983 B2
(45) Date of Patent: Dec. 10, 2019

(54) ENFORCING ENTERPRISE REQUIREMENTS FOR DEVICES REGISTERED WITH A REGISTRATION SERVICE

(71) Applicant: AirWatch LLC, Atlanta, GA (US)

(72) Inventors: Kevin Jones, Atlanta, GA (US); Naveen Pitchandi, Atlanta, GA (US)

(73) Assignee: AIRWATCH LLC, Atlanta, GA (US)

( * ) Notice: Subject to any disclaimer, the term of this patent is extended or adjusted under 35 U.S.C. 154(b) by 255 days.

(21) Appl. No.: 15/347,480

(22) Filed: Nov. 9, 2016

(65) Prior Publication Data
US 2018/0131721 A1 May 10, 2018

(51) Int. Cl.
| H04L 29/06 | (2006.01) |
| H04L 29/08 | (2006.01) |
| H04L 12/24 | (2006.01) |
| G06F 21/31 | (2013.01) |
| G06F 21/60 | (2013.01) |

(52) U.S. Cl.
CPC .............. *H04L 63/20* (2013.01); *G06F 21/31* (2013.01); *G06F 21/604* (2013.01); *H04L 41/0806* (2013.01); *H04L 63/083* (2013.01); *H04L 63/0861* (2013.01); *H04L 63/102* (2013.01); *H04L 67/306* (2013.01); *G06F 2221/2149* (2013.01); *H04L 63/101* (2013.01)

(58) Field of Classification Search
CPC ... H04L 63/20; H04L 63/0861; H04L 63/083; H04L 67/306; H04L 41/0806; H04L 63/102; H04L 12/58; H04L 63/0209; H04L 51/38; H04L 51/00; H04L 63/061; H04L 63/068; G06F 21/604; G06F 21/31; G06F 2221/2149
See application file for complete search history.

(56) References Cited

U.S. PATENT DOCUMENTS

| 6,496,979 B1 * | 12/2002 | Chen ......................... G06F 8/61 717/178 |
| 8,423,687 B2 * | 4/2013 | Srinivansan, Sr. .... G06Q 10/10 701/1 |
| 8,869,235 B2 * | 10/2014 | Qureshi ................. G06F 21/10 726/1 |
| 8,874,162 B2 * | 10/2014 | Schrader ............... H04W 12/08 340/670 |

(Continued)

OTHER PUBLICATIONS

"Managing Apple Devices" by Todd Fernandez published on 2014 (Year: 2014).*

*Primary Examiner* — Thanhnga B Truong
(74) *Attorney, Agent, or Firm* — Thomas | Horstemeyer, LLP (57) ABSTRACT

Disclosed are various examples for enforcing enterprise requirements for client device deployment. One example includes receiving a device enrollment request that is part of an activation of a client device that is registered with a registration service. A whitelist including a management application is enforced on the client device by installing a first profile on the client device. The management application is executed in a kiosk mode. The management application obtains at least one enterprise requirement including a terms of service. A second profile is installed on the client device causing the client device to cease enforcing the whitelist and the kiosk mode.

20 Claims, 6 Drawing Sheets

(56) References Cited

U.S. PATENT DOCUMENTS

| | | | |
|---|---|---|---|
| 9,083,752 B2* | 7/2015 | Shetty | H04L 63/0209 |
| 9,100,829 B2* | 8/2015 | Lee | G06F 21/51 |
| 9,110,732 B1* | 8/2015 | Forschmiedt | G06F 9/44505 |
| 9,112,749 B2* | 8/2015 | Dabbiere | H04L 29/08 |
| 9,185,099 B2* | 11/2015 | Brannon | H04L 63/08 |
| 9,307,451 B1* | 4/2016 | Kodeswaran | H04W 12/08 |
| 9,578,188 B1* | 2/2017 | Kircher | H04N 1/00244 |
| 9,602,508 B1* | 3/2017 | Mahaffey | H04L 63/0869 |
| 9,608,809 B1* | 3/2017 | Ghetti | H04L 9/083 |
| 9,635,014 B2* | 4/2017 | Venkataraman | H04L 63/0823 |
| 9,665,702 B2* | 5/2017 | King | G06F 21/31 |
| 9,672,338 B1* | 6/2017 | Kim | H04W 12/08 |
| 9,710,649 B2* | 7/2017 | Da Palma | G06F 21/57 |
| 9,917,862 B2* | 3/2018 | Phanse | H04L 63/20 |
| 2007/0078944 A1* | 4/2007 | Charlebois | H04N 21/235 709/217 |
| 2008/0086777 A1* | 4/2008 | Sanchez | G06F 21/121 726/26 |
| 2008/0263511 A1* | 10/2008 | Shapiro | G06F 8/61 717/104 |
| 2011/0023123 A1* | 1/2011 | King | G06F 21/105 726/26 |
| 2011/0065419 A1* | 3/2011 | Book | G06F 21/305 455/411 |
| 2012/0084184 A1* | 4/2012 | Raleigh | H04L 12/5691 705/30 |
| 2012/0129503 A1* | 5/2012 | Lindeman | H04L 67/34 455/414.1 |
| 2012/0216242 A1* | 8/2012 | Uner | G06F 21/50 726/1 |
| 2012/0291102 A1* | 11/2012 | Cohen | G06F 21/57 726/4 |
| 2012/0309464 A1* | 12/2012 | Lim | H04M 1/72522 455/566 |
| 2013/0007245 A1* | 1/2013 | Malik | H04L 41/0816 709/223 |
| 2013/0080522 A1* | 3/2013 | Ren | H04L 12/6418 709/204 |
| 2014/0033315 A1* | 1/2014 | Biswas | G06F 21/105 726/26 |
| 2014/0040977 A1* | 2/2014 | Barton | H04L 63/20 726/1 |
| 2014/0068755 A1* | 3/2014 | King | G06F 21/53 726/19 |
| 2014/0181959 A1* | 6/2014 | Li | G06F 21/32 726/19 |
| 2014/0215590 A1* | 7/2014 | Brand | H04L 67/1097 726/6 |
| 2014/0250145 A1* | 9/2014 | Jones | G06Q 10/101 707/769 |
| 2014/0280934 A1* | 9/2014 | Reagan | H04L 47/70 709/225 |
| 2014/0282610 A1* | 9/2014 | Strom | G06F 21/00 719/313 |
| 2014/0337528 A1* | 11/2014 | Barton | H04L 41/00 709/225 |
| 2015/0032655 A1* | 1/2015 | Said | G06Q 10/1053 705/321 |
| 2015/0150130 A1* | 5/2015 | Fiala | G06F 21/56 726/23 |
| 2015/0215772 A1* | 7/2015 | Gattu | H04W 8/245 455/418 |
| 2015/0244743 A1* | 8/2015 | Jagad | G06F 21/577 726/1 |
| 2015/0249617 A1* | 9/2015 | Chang | H04L 47/70 709/225 |
| 2015/0319252 A1* | 11/2015 | Momchilov | H04L 67/141 709/223 |
| 2015/0373023 A1* | 12/2015 | Walker | H04L 63/10 726/3 |
| 2016/0087956 A1* | 3/2016 | Maheshwari | G06F 8/60 726/6 |
| 2016/0094560 A1* | 3/2016 | Stuntebeck | H04L 63/102 726/1 |
| 2016/0112260 A1* | 4/2016 | Pai | H04L 67/141 709/222 |
| 2016/0188307 A1* | 6/2016 | Reagan | G06F 8/61 717/177 |
| 2016/0284035 A1* | 9/2016 | Muttik | G06Q 50/18 |
| 2016/0373431 A1* | 12/2016 | Van Den Broeck | H04L 63/083 |
| 2017/0048251 A1* | 2/2017 | Guday | H04W 12/08 |
| 2017/0094509 A1* | 3/2017 | Mistry | H04L 63/083 |
| 2017/0111247 A1* | 4/2017 | Uchiyama | H04L 43/0805 |
| 2017/0238753 A1* | 8/2017 | Merali | A47J 31/52 |

* cited by examiner

ENFORCING ENTERPRISE REQUIREMENTS FOR DEVICES REGISTERED WITH A REGISTRATION SERVICE

BACKGROUND

An enterprise can manage devices using a management service capable of protecting enterprise data including email and corporate documents, from theft, data loss, and unauthorized access. Enterprises can also register devices with a registration service so that a registered device is associated with the enterprise and a management service employed by the enterprise.

A registration service, such as the APPLE® Device Enrollment Program (DEP), can ensure that a device enrolls with a management service for device deployment at initial activation or activation after a device reset. However, customization options for registration services such as DEP can be limited. For example, registration services do not enforce customized enterprise requirements such as terms of use, multi-factor authentication, and other enterprise requirements.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to enforcing enterprise requirements during deployment of devices registered with a registration service. Device deployment generally refers to the distribution and setup of devices for use by employees of the enterprise. The registration service can, for instance, require enrollment of a device with a management service at initial activation or after a device reset (e.g., a factory reset). A management service can provide an administrator, such as one associated with an enterprise, with the ability to remotely manage the configuration of devices enrolled with the management service. The enterprise can determine enterprise requirements for device deployment and provisioning. Among these requirements are a requirement that a user associated with a device accept a particular terms of service of the enterprise or other enterprise requirements. However, enforcing certain enterprise requirements during deployment can be difficult, even when a device is registered with a registration service.

Activations can require a device to communicate with a registration service, such as the APPLE® Device Enrollment Program (DEP), on an iOS device. DEP provides for association of a device with a management service specified by the enterprise that owns the device, and in some cases, basic password authentication. However, customization options related to management can be limited and do not provide for certain enterprise requirements, including terms of service acceptance, multi-factor authentication, passcode creation for enterprise or management service applications or device access, and other enterprise requirements that might be created by the enterprise with respect to provisioning of the device. Without further customization options, enterprises are unable to enforce their enterprise requirements on initial device startup or factory reset. However, examples described herein include a management service having mechanisms capable of enforcing enterprise requirements during deployment or activation for devices registered with a registration service.

According to some examples described herein, a management service can receive a device enrollment request from a client device. The device enrollment request can be part of an activation sequence of the client device, which is registered with a registration service. Further, the management service can enable a whitelist including a management application by installing an initial profile on the client device and causing the management application to be executed on the client device with in a kiosk mode or single application mode. Kiosk mode or single application mode can cause the management application to be executed on a device without allowing a user to close or exit the application. These modes can also force or require the application to be displayed on a display of the device without allowing the user to display another application on the device.

The computing device can then cause the management application to obtain authentication data and can determine whether terms of use are accepted on the client device through the management application or identify a user acceptance of the terms of use. A second profile can be installed on the client device in response to determining that the terms of use are accepted. The second profile can be more permissive than the initial profile. For example, the second profile can disable the kiosk mode and cease to enforce the whitelist.

According to additional examples described herein, a client device can initiate an activation of the client device and receive enrollment data from a registration service in response to initiating the activation. Next, the client device can enroll with a management service identified in the enrollment data. A whitelist including a management application is enforced on the client device in a profile received from the management service. The client device can install the management application and launch the management application with a kiosk mode enabled. Further, terms of use can be presented within the management application, which must be accepted before the whitelist and the kiosk mode cease to be enforced on the client device.

Some examples described herein involve a computer-implemented method that involves receiving an enrollment request for a client device that is a required part of an activation or provisioning workflow of the device. The method further includes enabling a usage restriction that substantially limits the client device to usage of a management application, and causes the management application to be installed on the client device. The management application obtains at least one enterprise requirement using the client device before the usage restriction is disabled.

Figure 1:
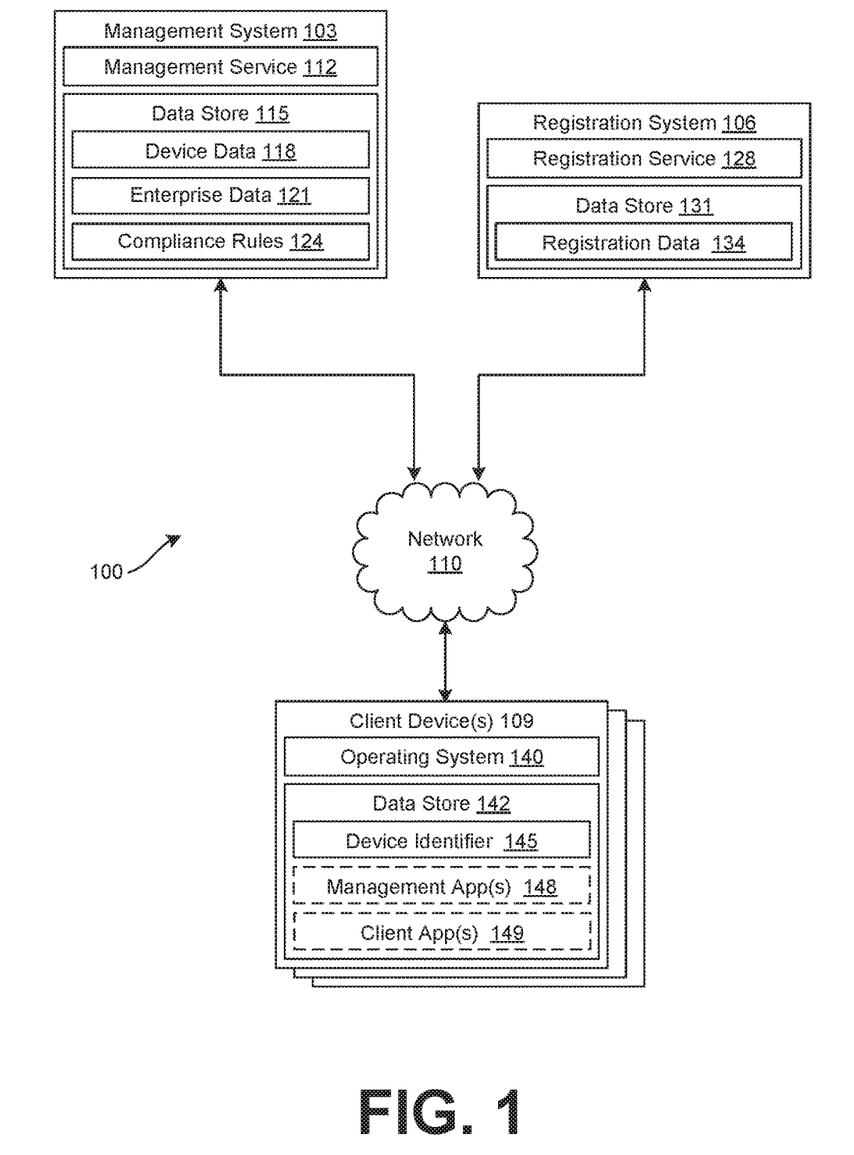
FIG. 1 is a drawing of an example of a networked environment including a management system, a device registration system, and at least one client device.

With reference to FIG. 1, shown is an example of a networked environment 100. The networked environment 110 can include a management system 103, a registration system 106, and client device 109 in communication with one another over a network 110. The network 110 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The management system 103 can include, for example, a server computer or any other system providing computing capability. Alternatively, the management system 103 can include multiple computing devices that are arranged, for example, in one or more server banks, computer banks, or other arrangements. The management systems 103 can include a grid computing resource or any other distributed computing arrangement. The computing devices can be located in a single installation or can be distributed among many different geographical locations. The management systems 103 can also include or be operated as one or more virtualized computer instances. For purposes of convenience, the management system 103 is referred to herein in the singular. Even though the management system 103 is referred to in the singular, it is understood that multiple management systems 103 can be employed in the various arrangements as described above. As the management system 103 communicates with the client device 109 remotely over the network 110, the management system 103 can be described as a remote management system 103 or a collection of one or more remote computing devices.

The components executed on the management system 103 can include, for example, a management service 112 as well as other applications, services, processes, systems, engines, or functionality not discussed in detail herein. The management service 112 can oversee the operation of client devices 109 enrolled with the management service 112 as well as manage print operations performed by the client devices 109. The management service 112 can be stored in the data store 115. In some embodiments, an enterprise, such as one or more companies or other organizations, can operate the management service 112 to oversee or manage the operation of the client devices 109 of its employees, contractors, customers, students, or other users having user accounts with the enterprise. An enterprise can be any customer of the management service 112.

The data store 115 can include memory of the management system 103, mass storage resources of the management system 103, or any other storage resources on which data can be stored by the management system 103. The data stored in the data store 115, for example, can be associated with the operation of the applications and/or functional entities described herein. The data stored in the data store 115 can include, for example, device data 118, enterprise data 121, compliance rules 124, as well as other data. Generally, device data 118 includes data associated with a configuration of a client device 109 enrolled or managed by the management service 112. For instance, the device data 118 can include an enrollment status indicating whether a client device 109 has been enrolled with the management service 112. In one example, a client device 109 designated as "enrolled" can be permitted to access the enterprise data 121 while a client device 109 designated as "not enrolled," or having no designation, can be denied access to the enterprise data 121.

Additionally, device data 118 can include indications of the state of the client device 109. In one example, these indications can specify applications that are installed on the client device 109, configurations or settings that are applied to the client device 109, user accounts associated with the client device 109, the physical location of the client device 109, the network to which the client device 109 is connected, and other information describing the current state of the client device 109.

Further, device data 118 can also include data pertaining to user groups. An administrator can specify one or more of the client devices 109 as belonging to a particular user group. User groups can be created by an administrator of the management service 112 such that a batch of client devices 109 can be configured according to common settings. For instance, an enterprise can create a user group for the marketing department and the sales department, where the client devices 109 in the marketing department are configured differently from the client devices 109 in the sales department.

Compliance rules 124 can include, for example, configurable criteria that must be satisfied for an enrolled one of the client devices 109 to be "in compliance" with the management service 112. In one example, compliance rules 124 can include enterprise requirements that an enterprise requires to be completed on deployment or activation of the client devices 109, such as at the initial startup of the device, or upon a wipe or factory reset of the client device 109. The compliance rules 124 can also include an initial profile to send, enforce or enact on a client device 109 in response to an enrollment request for the client device 109 during its activation. The profile, enterprise requirements, and other compliance rules 124 can be based on a number of factors including geographical location of the client device 109, activation status, enrollment status, authentication data including authentication data obtained by a device registration system, time, and date, and network properties, among other factors. The compliance rules 124 including the profile and the enterprise requirements can also be determined based on a user profile associated with a particular user, or a device identifier 145 of the client device 109. The user profile can be determined by obtaining authentication data from the client device 109. The user profile can be associated with compliance rules 124 that are further determined based on time, date, geographical location and network properties detected by the client device 109. The user profile can further be associated with a particular user group, and compliance rules 124 can be determined in view of the user group.

Compliance rules 124 can include predefined constraints that must be met in order for the management service 112, or other applications, to permit access to the enterprise data 121 or other features of the client device 109. In some examples, the management service 112 communicates with the management application 148 or other client application 149 executable on the client device 109 to determine whether states exist on the client device 109 that do not satisfy one or more compliance rules 124. Some of these states can include, for example, a virus or malware being detected on the client device 109; installation or execution of a blacklisted client application 149; a client device 109 being "rooted" or "jailbroken," where root access is provided to a user of the client device 109. Additional states can include the presence of particular files, questionable device configurations, vulnerable versions of client applications 149, or other vulnerability, as can be appreciated.

The registration system 106 can include, for example, a server computer or any other system providing computing capability. Alternatively, the registration system 106 can include a plurality of computing devices that are arranged, for example, in one or more server banks, computer banks, or other arrangements. Components executed on the registration system 106 can include, for example, a registration service 128 as well as other applications, services, processes, systems, engines, or functionality not discussed in detail herein. The registration system 106 can have a data store 131. The data store 131 can include memory, mass storage resources, or any other storage resources on which data can be stored by registration system 106.

The data stored in the data store 131 can include, for example, registration data 134, as well as other data. Generally, registration data 134 includes information regarding ownership and control of devices. The registration data 134 can include ownership information including whether a client device 109 is associated with a particular enterprise or customer. For example, an enterprise can purchase the client device 109 and register as owner or operator of the client device 109 with the registration system 106. The registration can be completed per-client device 109 basis or in groups of client devices 109. To this end, the registration system 106 can associate a device identifier 145, or another identifier of a client device 109 or group of client devices 109, with the enterprise in the registration data 134.

The enterprise can employ the management service 112 or be a customer of the management service 112. The registration data 134 can identify a network address or other identifying information regarding a management service 112 that is specified by the enterprise for one or more client devices 109 of the enterprise that are enrolled with the registration service 128. In some embodiments, the registration system 106 can be operated by an entity that manufactures the client device 109, for example, an original equipment manufacturer (OEM). In other embodiments, the registration system 106 can be operated by another entity. Device registration systems including the registration system 106 can include a system like APPLE® DEP, which is part of APPLE® Deployment Programs (ADP).

The client device 109 can be representative of one or more client devices 109. For purposes of convenience, the client device 109 is often referred to herein in the singular. The client device 109 can include a processor-based system, such as a computer system, that can include a desktop computer, a laptop computer, a personal digital assistant, a cellular telephone, a smartphone, a set-top box, a music player, a tablet computer system, a game console, an electronic book reader, a smartwatch, or any other device with like capability. The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another.

The client device 109 can include an operating system 140 and a data store 142. The client device 109 can execute the operating system 140, which can be stored in the data store 142. The client device can include the device identifier 145, such as a serial number or other identifier, which can be unique to the client device 109. The device identifier 145 can be present on the client device 109 upon initial activation and can persist after a wipe of the client device 109 such as a factory reset.

The client device 109 can execute applications including a management application 148 and other client applications 149. Some client applications 149 can include a browser, a device settings interface, or other applications. Further, other client applications 149 can include device management applications, enterprise applications, social networking applications, word processors, spreadsheet applications, media player applications, or other applications. In some cases, the management application 148 and the client applications 149 are not installed on the client device 109 upon initial activation and do not persist after a wipe of the client device 109 and subsequent activation. The management application 148 can be representative of multiple management applications, which can include an agent application or another application associated with the management service 112. The applications can access network content served up by the management system 103, the registration system 106, or other servers.

The client devices 109 can include a display upon which a user interface is generated by the client application 149 or another application can be rendered. The display can be a liquid crystal display (LCD), organic light emitting diode (OLED), touch-screen display, or other type of display device. The client device 109 can also include one or more input/output devices that can include, for example, a capacitive touchscreen or other type of touch input device, fingerprint reader, or keyboard.

The client device 109 can have an activation sequence. The activation sequence can be a part of the operating system 140. Alternatively, the activation sequence can be separate from the operating system 140. The activation sequence can be performed any time activation is initiated. For example, the activation sequence can be performed the first time the client device 109 is turned on or in other situations, such as after a wipe or factory reset of the client device 109. The activation sequence can be required before any other action is performed using the client device 109, such as executing an application using the client device 109. The activation sequence can instruct the client device 109 to contact the registration system 106 during activation, which can be considered an activation request. Contacting the registration system 106 can be a requirement of the activation of the client device 109. In response, the client device 109 can receive management information or other information from the registration system 106. The activation sequence can be set or designed by a manufacturer of the client device 109 or an entity producing the client device or the operating system 140, and can include some custom options specified by an administrator of the client device 109 or by a management service 112.

The activation sequence can require that the client device 109 be enrolled with the management service 112. In some examples, a client device 109 sends an enrollment request to the management service 112 using the management information received from the registration system 106 during the activation sequence. In other examples, the management service 112 can request enrollment on behalf of the client device 109. Enrollment of the client device 109 can include installing a profile or executing a command specified by the management service 112, or other requirements. While some activation sequences can be altered or customized, the activation sequence can have limited functionality and provide for little customization.

A client device 109 that supports enrollment with a management service 112 through a registration system 106 can have an operating system 140 or a client application 149 that supports management functionalities. For example, the operating system 140 can install a management profile associated with the management service 112 to enroll the client device 140 with the management service 112. Further, the operating system 140 can perform actions retrieved from a command queue of the management service 112, such as installing a profile or executing a command specified by the management service 112, or other requirements.

For example, an APPLE® device that supports APPLE® DEP can have an activation sequence that can require a username and password, but does not support multi-factor authentication, Security Assertion Markup Language (SAML) authentication, lightweight directory access protocol (LDAP) based authentication, or token based authentication. An activation sequence may not support a flow that requires a user to accept a terms of use specified by an enterprise or a customer of the management service 112 to complete activation and provisioning of the client device 109.

Once the management application 148 is installed, the management service 112 can remotely configure the client device 109 by interacting with a management application 148 executed on the client device 109, for instance by causing the management application 148 to install a profile, execute a command, or render a user interface for display to a user. Further, the management service 112 can communicate various software components to the client device 109 that are then installed or configured by the management application 148 or at the direction of the management application 148 (e.g., by the operating system 140, at the direction of the management application 148). These software components can include, for example, client applications 149, resources, libraries, drivers, device configurations, or other similar components that require installation on the client device 109 as specified by an administrator of the management service 112. The management service 112 can further cause policies to be enforced on the client device 109 by the management application 148 or by the operating system 140 of the client device 109. Policies can include, for example, restrictions or permissions pertaining to capabilities of a client device 109. For instance, policies can require certain hardware or software functions of the client device 109 to be enabled or be disabled during a certain time period or when the client device 109 is physically located at a particular location.

The management service 112 can interact with one or more client applications 149 executed on the client device 109 by transmitting data over the network 110. In one example, the management service 112 can interact with a management application 148 on the client device 109 to enroll the client device 109 with the management service 112. During the enrollment, the management application 148 can be registered as a device administrator of the client device 109, which can provide the management application 148 with sufficient privileges to control the operation of the client device 109. In one example, the management application 148 can be registered as the device administrator through the installation of a management profile in a profile bank of the operating system 140 of the client device 109 in response to a user of the client device 109 accepting terms and conditions related to management of the client device 109. The installation of the management profile in the profile bank of the operating system 140 causes the operating system 140 to designate the management application 148 as the device administrator, which allows the management application 148 or the management service 112 to instruct the operating system 140 to perform certain operations and configure the client device 109.

The management service 112 can instruct the management application 148 to perform device management functions on the client device 109. For example, the management service 112 can direct the management application 148 to control access to certain software or hardware functions available on the client device 109. As a result, the management service 112 can verify that configuration and operation of the client device 109 is in conformance with predefined criteria that ensures that enterprise data or other data is protected from data loss, unauthorized access, or other harmful events. The management service 112 can further provision enterprise data to the client device 109 through the management application 148.

In one example, the management service 112 can cause the management application 148 to control use of the client device 109 or provision enterprise data to the client device 109 through use of a command queue provided by the management service 112. The management service 112 can store commands in a command queue associated with a particular client device 109 and can configure the management application 148 executed by the client device 109 to retrieve the contents of the command queue. In one example, the management application 148 can retrieve the contents of the command queue on a configured interval, such as every four hours, or upon occurrence of a certain event, such as a detection of an unauthorized application executed by the client device 109. In any case, the management application 148 can retrieve the contents of the command queue by checking in with the management service 112 and requesting the contents of the command queue. In one example, the contents of the command queue can include a command that the management application 148 causes to be executed on the client device 109. In another example, the contents of the command queue can include a resource or a client application 149 that the management application 148 causes to be installed on the client device 109, which the client device 109 may access through a specified uniform resource locator (URL).

Also, the management service 112 can request that the client device 109 check-in using a notification service like APPLE® Push Notification Service (APNS), GOOGLE® Cloud Messaging (GCM), or WINDOWS® Push Notification Services (WNS). For example, the management service 112 can transmit a request to the notification service requesting that the client device 109 check-in. The notification service can push or otherwise route a notification to the client device 109. Once the notification is received, the operating system 140, management application 148, or another client application 149 can cause the client device 109 to check-in with the management service 112.

Various compliance rules 124 can be enforced by the management service 112 on a client device 109 enrolled as a managed device. In one example, the command queue can be leveraged to enforce compliance rules 124 on an enrolled client device 109. Compliance rules 124 can be based on time, geographical location, or device and network properties. For instance, the client device 109 can satisfy a compliance rule 124 when the client device 109 is located within a particular geographic location. The client device 109 can satisfy a compliance rule 124 in other examples when the client device 109 is in communication with a particular local area network, such as a particular local area network that is managed by the computing environment 203. Furthermore, a compliance rule 124 in another example can be based upon the time and date matching specified values.

A compliance rule 124 can specify that a client device 109 is required to be off or in a low power "sleep" state during a specified time period. Another compliance rule 124 can specify that a client device 109 is required to be on or in a normal operation "awake" state during a specified time period. As another example, a compliance rule 124 can specify that a client device 109 is prohibited from rendering content that has been designated as confidential.

Other examples of compliance rules 124 include a rule that specifies whether a client device 109 is compromised or "jailbroken." For example, a client device 109 can have hardware or software protections in place that prevent unauthorized modifications of the client device 109. If these protections are violated, overridden or bypassed, the client device 109 can be considered out of compliance. As another example, a compliance rule 124 can specify that the client device 109 is required to prompt a user for a password or personal identification number (PIN) in order to unlock the client device 109.

A compliance rule 124 can also require that the client device 109 have device encryption enabled, where data stored on the client device 109 is stored in an encrypted form. The data can be encrypted by a device certificate. A compliance rule 124 can also specify that the client device 109 is enrolled with the management service 112 as a managed device, causing the management service 112 to have device administrator privileges over the client device 109 to control and/or configure one or more functions of the client device 109 as described herein. Another compliance rule 124 can specify that the user is required to accept the terms of service that are presented by the management application 148 on the client device 109. As another example, a compliance rule 124 can specify that the management application 148 is required to periodically communicate or "check-in" with the management service 112 to report on its status. If a threshold amount of time has elapsed since the previous check-in, the client device 109 can be considered to have violated this compliance rule 124.

Another compliance rule 124 can specify that a client device 109 run one of a number of specified variants or versions of a particular operating system 140. A compliance rule 124 can also require that client devices 109 be manufactured by a particular manufacturer, or that an enrolled client device 109 have a particular manufacturer identifier. Another compliance rule 124 can require that an enrolled device be a particular model name or model number. A client device 109 can also be considered out of compliance if the client device 109 is in a data roaming mode or has used a threshold amount of a periodic network data usage allowance.

A compliance rule 124 can also identify a list of required applications that must be installed on the client device 109 (e.g., a whitelist) or a list of forbidden applications that are not allowed to be installed on the client device 109 (e.g., a blacklist). The management application 148 can remove a forbidden application or install a missing required application on the client device 109 in response to detecting a violation of such a compliance rule 124. A compliance rule 124 can also require the presence of a mobile device management (MDM) profile, an MDM storage area, an application profile, and/or a configuration profile. The management application 148 can obtain and store missing required data or containers on the client device 109 in response to detecting a violation of such a compliance rule 124.

Figure 2:
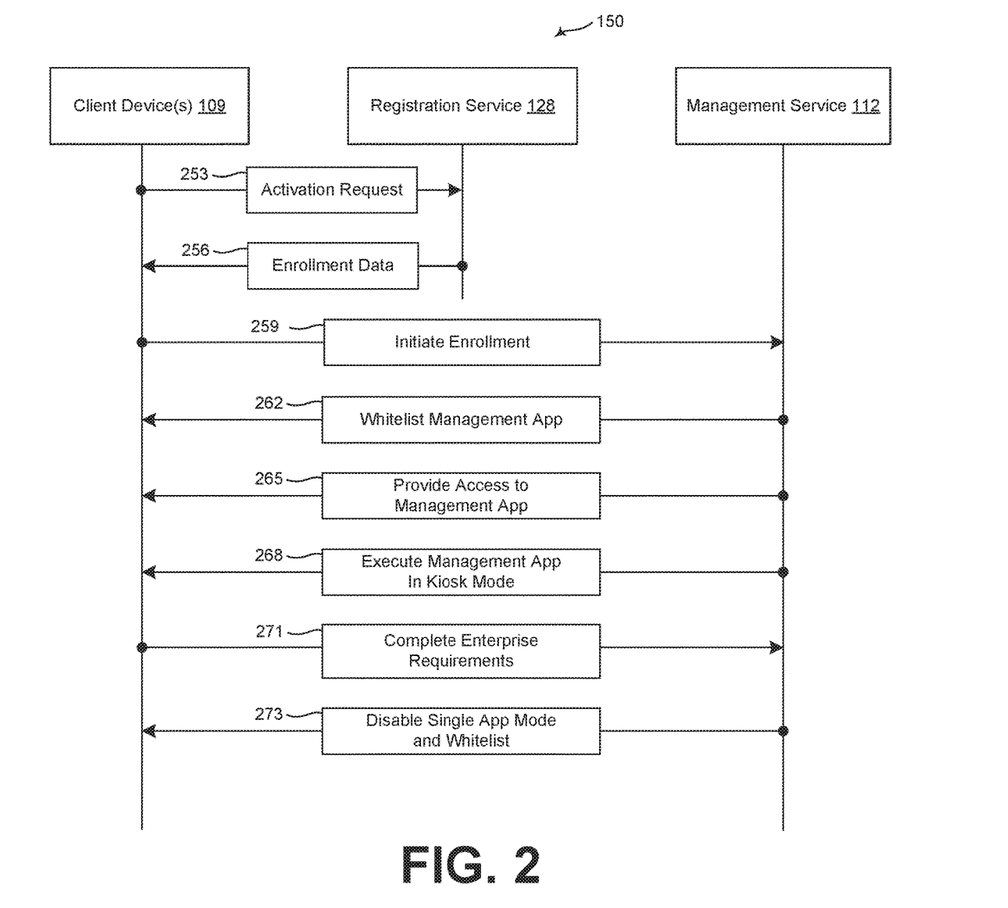
FIG. 2 is a sequence diagram illustrating functionality implemented by components of the networked environment.

Turning now to FIG. 2, shown is a sequence diagram 150 illustrating various functionality of the components of the networked environment 100 to enforce enterprise requirements for client devices 109 registered with the registration service 128.

Starting with step 253, the client device 109 can send an activation request to activate the client device 109 through the registration service 128. The activation request can be sent as a required part of an activation sequence specified by the operating system 140 of the client device 109. The request can include information about the client device 109, including the device identifier 145, such as a serial number or other identifier.

At step 256, the registration service 128 can send enrollment data to the client device 109. For example, the registration service 128 can identify the serial number received from the client device 109 to see whether the serial number corresponds to an enterprise that has registered as owner of the client device 109 with the registration service 128. If an enterprise has registered the client device 109, and has associated the client device 109 with the management service 112, then the registration service 128 can send a network address of the management service 112 to the client device 109. The registration service or the activation sequence can also require that the enrollment data be used to initiate enrollment of the client device 109 as a managed device with the management service 112 before the activation sequence of the client device 109 is complete. For example, the registration service can require that a profile from the management service 112 be installed on the client device 109 before the activation sequence is allowed to advance.

At step 259, the client device 109 can initiate enrollment with the management service 112 using the enrollment data obtained from the registration service 128. For example, a request to enroll the client device 109 with the management service 112 can be made from the client device 109, from the registration service 128, or another device. The activation sequence can require that the client device 109 be configured, for example, by at least one profile or command from the management service 112, before allowing the client device 109 advance within the activation sequence. In one example, the enrollment data includes a server address or URL associated with the management service 112. The operating system 140 or a client application 149 can implement a profile or a command from the command queue of the management service 112.

At step 262, the management service 112 can whitelist the management application 148 by causing a whitelist to be enforced on the client device 109. For example, the management service 112 can provide a profile or a command that causes the whitelist to be enforced on the client device 109. The operating system 140 of the client device 109 can provide for application whitelisting by restricting installation of applications on the client device 109 to those in the whitelist, and in some cases removing applications that are not in the whitelist.

Application whitelisting can block all applications from running other than those that are included in a whitelist, or prohibit access to applications that are not included in the whitelist, until the whitelist is disabled. A whitelist can cease to be enforced by deleting or uninstalling the profile that enabled the whitelist, or by installing a new profile on the client device 109. In some cases, an operating system 140 can specify system applications or functionalities that are available in addition to the applications in the whitelist, while a whitelist is enforced. For example, some APPLE® operating systems allow access to settings while a whitelist is enforced.

Whitelisting the management application 148 can be performed by providing an initial profile to the client device 109. In some examples, the initial profile may include information in addition to or instead of the whitelist. The operating system 140 can install the initial profile to enforce or enable a whitelist that includes the management application(s) 148.

In this way, the management service 112 can ensure that the management application 148 is the only application that can be used on the client device 109 after the activation sequence is completed. In some cases, a whitelist can allow some basic functions, such as certain settings of the client device 109 that can be accessed in addition to the whitelisted application(s) in the whitelist. In other examples, only the whitelisted applications can be accessed. Other profiles, commands, or applications can be sent along with, or instead of the whitelist. The initial profile, commands or applications can be determined based on geographical location, the device identifier 145, authentication data obtained from the activation sequence, or other information.

At step 265, the management service 112 can provide the client device 109 with access to the management application 148 by a command specifying a URL from which the management application 148 can be retrieved. The management application 148 can then be retrieved and installed on the client device 109. For example, the operating system 140 or a client application 149 can execute the command causing the client device 109 to obtain the management application 148 from an application store, or a particular network location or source. The enterprise requirements can be provided as part of the management application 148, or the enterprise requirements can be communicated to the management application 148 from the management service 112 after installation.

At step 168, the management service 112 can cause the client device 109 to enable a single application mode or kiosk mode that limits the client device 109 to running the management application 148 and no other applications aside from the operating system 140. For example, the management service 112 can cause the client device to execute the management application 148 in single application mode (e.g., a kiosk mode) by causing a profile to be installed on the client device 109 that causes the client device to operate in such mode.

At step 271, client device 109 can complete enterprise requirements and notify the management service 112 of completion of the enterprise requirements. The enterprise requirements can be provided to the management application 148 by the management service 112, or can be provided in a particular version of the management application 148 that is retrieved and installed by the client device 109. The enterprise requirements can be determined based on a number of factors including geographical location of the client device 109, activation status, enrollment status, authentication data, time, date, network properties, a user profile associated with a particular user, and a device identifier 145 of the client device 109, among other factors.

The enterprise requirements can include requirements that are not supported by the registration service 128 or the activation sequence. The client device 109 can be in a kiosk mode that limits use of the client device 109 to the management application 148, and the management application 148 can ensure completion of the enterprise requirements or obtain the enterprise requirements.

For instance, the enterprise requirements can include an authentication requirement and the management application 148 can obtain authentication data from a user. The authentication data can include a username, a password, a personal identification number (PIN), biometric data, or a combination thereof. The management application 148 can also authenticate the client device 109 with another device using any multi-factor authentication, SAML, LDAP, or token based authentication. The management application 148 can support authentication factors or another form of authentication that is not supported by the registration service 128 or the activation sequence.

The enterprise requirements can include a requirement to accept a particular terms of service or terms of use. In this instance, the management application 148 can obtain acceptance of terms of service associated with a customer of the management service 112 such as the enterprise that owns the client device 109. To this end, the management application 148 can obtain the terms of use by receiving a file or other data from the management service 112. The management application 148 can display the terms of service on a display of the client device 109 and require acceptance before the management service 112 will disable or cease to enforce restrictions on the client device like the single app mode or the whitelist. The management application 148 can require the client device 109 to access the terms of use through a secure content locker application that can obtain and present the terms of use. In some cases, the secure content locker application can be part of the management application 148.

Further, the enterprise requirements can include a requirement to create a passcode to access one or more application, such as an application associated with the management service 112 or the customer or enterprise employing the management service 112. A passcode can also be created to unlock or access the client device 109. The enterprise requirements can include any of the compliance rules 124 discussed above. Further, the enterprise requirements can be determined based on any factor, including geographical location of the client device 109, time, date, authentication data including authentication data obtained by a device registration system or through the management application 148, among other factors. Authentication data can be associated with a user profile.

Also, the enterprise requirements can include a requirement to view a series of content (e.g. onboarding new employees) and/or perform other tasks related to content. In some examples, the requirement to view a series of content can further include using a secure content locker application to view the content. The secure content locker application can provide secure access to content and can support presentation of audio, video, image, text, and other forms of content. In one example, an administrator of the management service 112 can specify one or more content files that should be made accessible to a user of the client device 109 through the secure content locker application. The secure content locker application can generate log information describing accesses to the content files by the user of the client device 109, which can include time and date when particular files were accessed, the duration for which the particular files were accessed, the physical location of the client device 109 when the particular files were accessed, and/or other contextual information. The secure content locker application can transmit such log information to the management service 112, which can store it for later viewing by an administrator or for use in compliance determinations. Additionally, in one example, an administrator of the management service 112 can specify one or more tasks related to the content that must be performed by the user of the client device 109. For instance, the secure content locker application can securely capture photo, video, audio, and text, and the administrator of the management service 112 can specify that certain photos, videos, audio, or text related to the content should be captured by the user of the client device 109. For instance, the secure content locker application can provide a user of the client device 109 with access to a video file that includes a human resources onboarding presentation, and can request a user of the client device 109 to provide an e-signature on an employment agreement PDF document file or request that the user use the camera to scan a physically signed hard copy of such agreement once the video file has been accessed. The use of a secure content locker application can also be required for viewing a terms of service, and other content. In some instances, the secure content locker application can be part of the management application 148. The management application 148 can identify that the series of content has been presented and communicate completion of the series of content to the management service 112.

Moving to step 273, the management service 112 can disable single application mode or kiosk mode in response to receiving an indication that the enterprise requirements have been completed. For example, the management service 112 can disable single application mode by pushing an updated profile that does not enforce the kiosk mode. In this way, the enterprise requirements can be enforced before the kiosk mode is disabled. The updated profile can also disable the whitelist, or can add additional applications to the whitelist so that the client device 109 is not limited to using the management application 148. Additional commands, applications, or profiles can be sent along with the profile that disables kiosk mode.

Figure 3:
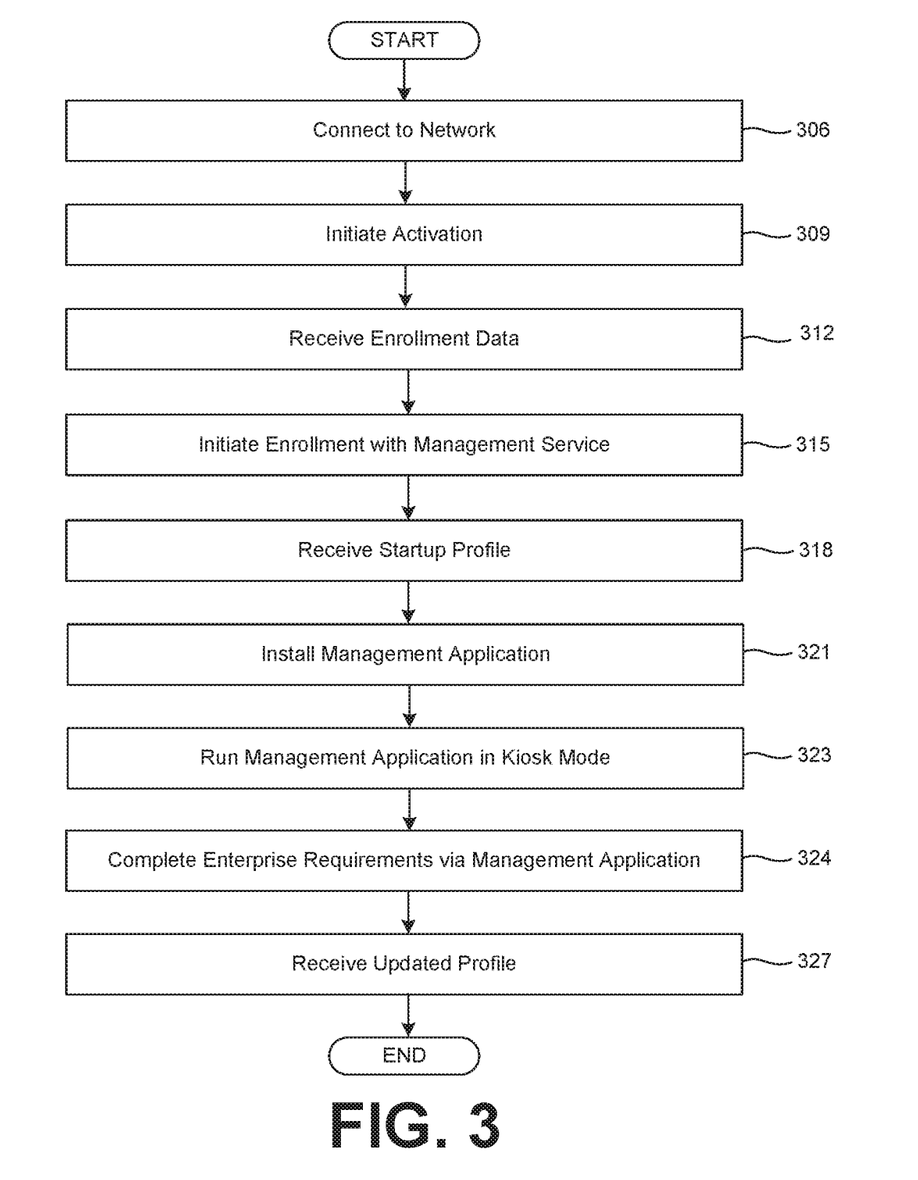
FIGS. 3-4 are flowcharts illustrating functionality implemented by components of the networked environment.

With reference to FIG. 3, shown is a flowchart illustrating functionality implemented by the client device 109. Starting with step 306, the client device 109 can connect to a network, such as the network 110. This step can be implemented by the client device 109 during an activation sequence such as initial startup of the client device 109 or after a factory reset of the client device 109. The activation sequence can have more or fewer requirements than those described herein, and can include some customization such as removal or inclusion of basic requirements.

Moving to step 309, the client device 109 can initiate activation of the client device 109. This can include a communication with the registration service 128, and can be part of the activation sequence that is performed before other functionality can be accessed on the client device 109. For example, the client device 109 can be turned on for the first time. The operating system 140 can have a predetermined activation sequence including a number of setup screens such as network setup. Once a network connection is established, the activation sequence can require the client device 109 to connect to the registration service 128. The registration service 128 can check an identifier received from the client device 109 to see whether it corresponds to an enterprise that has registered as owner of the client device 109 with the registration service 128. The registration service 128 can have the management service 112 listed in association with the client device 109 and/or the enterprise.

In step 312, the client device 109 can receive enrollment data in response to the request for activation. The enrollment data can be received from the device registration service 128. For example, the registration service 128 can send a network address of the management service 112 to the client device 109 when the device identifier 145 of the client device 109 corresponds to an enterprise that has associated the client device 109 with the management service 112 through registration.

At step 315, the client device 109 can initiate enrollment of the computing device with a management service 112 identified in the enrollment data. Initiating enrollment can be performed on the client device 109 in response to an enrollment request from the client device 109 or another device, such as the registration service 128. For example, initiating enrollment can include obtaining an enrollment token from the management service 112, or checking-in with the management service 112 on the client device 109. The client device 109 can check-in with the management service 112. The management service 112 can provide a profile or a command that can be implemented by the operating system 140 or a client application 149.

As shown at step 318, the enrollment process can include receiving a profile from the management service 112. Once received, the profile can be installed on the client device 109. In some cases the registration service 128 can require confirmation that the profile from the management service 112 is installed on the client device 109 before the activation sequence is allowed to advance. The client device 109 can whitelist the management application 148 in response to receiving the profile from the management service 112. The whitelist can prevent applications other than the management application 148 from running on the client device 109, and in some cases can prevent other applications from being downloaded or retrieved.

As indicated in step 321, the client device 109 can install the management application 148. To this end, the client device 109 can receive a command or a directive from the management service 112 that initiates retrieval of the management application 148 from a network source. The management service 112 can specify a URL from which the management application can be accessed by the client device 109. Once the management application 148 is obtained, it can be installed on the client device 109.

In step 323, the client device 109 can run the management application 148 in kiosk mode. For example, the client device 109 can be directed to launch the management application 148 with a kiosk mode enabled in response to a command or another action communicated by the management service 112. Launching the management application 148 with a kiosk mode enabled can cause the management application 148 to be executed on the client device 109 without allowing a user to close or exit the application. The kiosk mode can also force the management application 148 to be displayed on a display of the client device 109 without allowing the user to display another application on the client device 109.

Moving to step 324, the client device 109 can complete enterprise requirements through the management application 148. In this way, the enterprise requirements can be enforced before any other functionality of the client device 109 can be accessed after activation requirements such as those of an activation sequence are completed. The requirements can be enforced by the management application 148 before allowing the client device 109 to exit a kiosk mode. One enterprise requirement can include presenting a terms of use associated with a customer of the management service 112 and obtaining acceptance of the terms of use before the kiosk mode is disabled, the whitelist is removed or expanded, or any other functionality of the client device 109 can be accessed. The terms of use can be presented through the management application 148.

Another enterprise requirement can include obtaining authentication data, such as a username, a password, a personal identification number (PIN), biometric data, or a combination thereof. In some instances, the authentication data can be obtained before a terms of use is presented, and the terms of use can be determined and presented based on the authentication data that is obtained. Yet another enterprise requirement can include having a user enter or set a passcode such as one used to access an application or some enterprise functionality. The passcode can be set using the management application 148.

The authentication data can be associated with a user profile. The user profile can be utilized to determine or tailor other enterprise requirements. For example, a user can enter a username and password or other authentication data through the management application 148. The management application 148 can identify a user profile associated with the authentication data and further determine a particular terms of service must be accepted. In some cases a user group can be associated with the user profile, and enterprise requirements can be determined based on the user group.

At step 327, the client device 109 can receive an updated profile. This can occur once the enterprise requirements are completed using the management application 148 and communicating their completion to the management service 112. The updated profile can, for example, disable the kiosk mode that was enabled on the client device 109. The updated profile can also disable the whitelist that was enabled on the client device 109, or expand the whitelist to include or allow additional applications or functionality according to the compliance rules 124.

Figure 4:
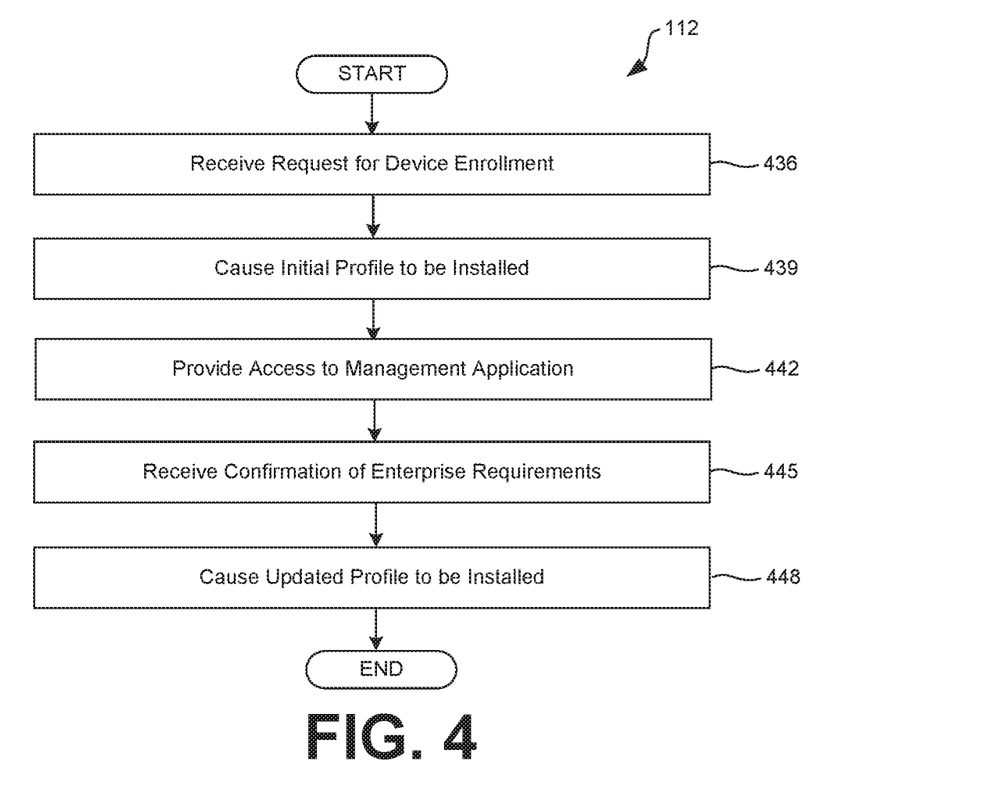

With reference to FIG. 4, shown is a flowchart illustrating functionality implemented by the management service 112. Starting with step 436, the management service 112 can receive a device enrollment request for the client device 109. The enrollment request can be received from the client device 109 or alternatively from another device such as the registration system 106. The enrollment request can be sent as part of an activation of the client device 109 that is registered with the registration service 128 and can be a required part of an activation sequence of the client device 109. The enrollment request can include device information such as serial number or other identifier, as well as authentication data obtained by the activation sequence.

At step 439, the management service 112 can cause an initial profile to be installed on the client device 109. The initial profile can enable a usage restriction that substantially limits the client device 109 to usage of the management application 148. For example, the usage restriction can include a profile that enables a whitelist that includes only the management application 148 and that only allows certain settings or other limited functionality of the client device 109 to be accessed. For example, network settings may be left available so the client device 109 can maintain a connection with the management service 112 through the network 110. Other settings may be available because the operating system 140 does not allow a profile or command to remove access to them. The usage restriction can include allowing or limiting access to settings including language settings, GPS and location services, camera settings, ad tracking, privacy, software updates, auto-lock, and passcode lock, among other settings.

At step 442, the management service 112 can provide the client device 109 with access to the management application 148. For example, the management service 112 can push a command to retrieve the management application 148 to the client device 109. The command to retrieve the management application 148 can identify a network location or network source where the management application 148 can be downloaded or obtained. The management service 112 can also cause the management application 148 to be launched on the client device 109 in a kiosk mode through the command or additional commands sent to the client device 109.

At step 445, the management service 112 can receive confirmation from the client device 109 that enterprise requirements have been completed. The enterprise requirements can be provided to the management application 148 by the management service 112, or can be provided in a particular version of the management application 148 that is retrieved and installed by the client device 109. The enterprise requirements can be determined based on a number of factors including geographical location of the client device 109, activation status, enrollment status, authentication data, time, date, network properties, a user profile associated with a particular user, and a device identifier 145 of the client device 109, among other factors. To this end, the management service 112 can cause the management application 148 to obtain the enterprise requirements using the client device 109 before the usage restriction is disabled.

The enterprise requirements can involve requiring acceptance of a terms of use or any enterprise requirement through the management application 148. For example, the management application 148 can obtain the terms of use from the management service 112, or the management service 112 can provide access to the terms of use by specifying a URL from which the terms of use can be retrieved. The terms of use can be obtained and presented on the client device 109 by the management application 148, or alternatively by a secure content locker application. The terms of use can be accepted by a user through a user interface element rendered by the management application 148 (or secure content locker application), and an indication of acceptance of the terms can be transmitted by such application to the management service 112. Once user acceptance of the terms of use identified, and all other enterprise requirements are completed, the management application 148 can communicate a confirmation that the enterprise requirements are completed to the management service 112.

As shown in step 448, once the enterprise requirements are received, the management service 112 can cause an updated profile to be installed on the client device 109 and can cause additional commands to be executed on the client device 109. The updated profile and additional commands can allow the client device 109 to be used more freely. For example, the updated profile can delete the initial profile or disable some of the restrictions enabled by the initial profile. Also, the management service 112 can allow access to enterprise data such as enterprise email or other protected data once the management service 112 receives confirmation that the enterprise requirements are completed.

Figure 5:
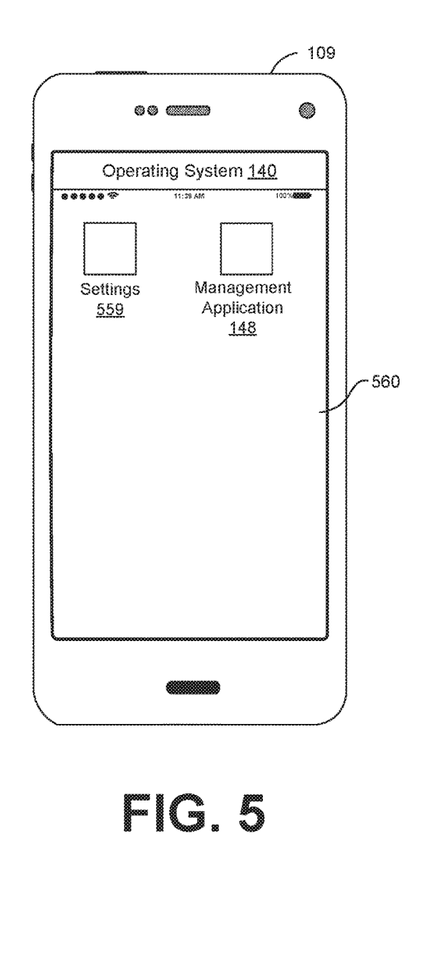
FIG. 5 is an operating system rendered on a client device of the networked environment.

FIG. 5 shows an example of an operating system 140 rendered on the client device 109 of the networked environment 100. The operating system 140 can be representative of the client device 109 being substantially limited to usage of the management application 148 by a whitelist that includes the management application 148. While the operating system 140 also allows settings 559 to appear on a user interface 560, the functionality available through the settings 559 can be limited.

Figure 6:
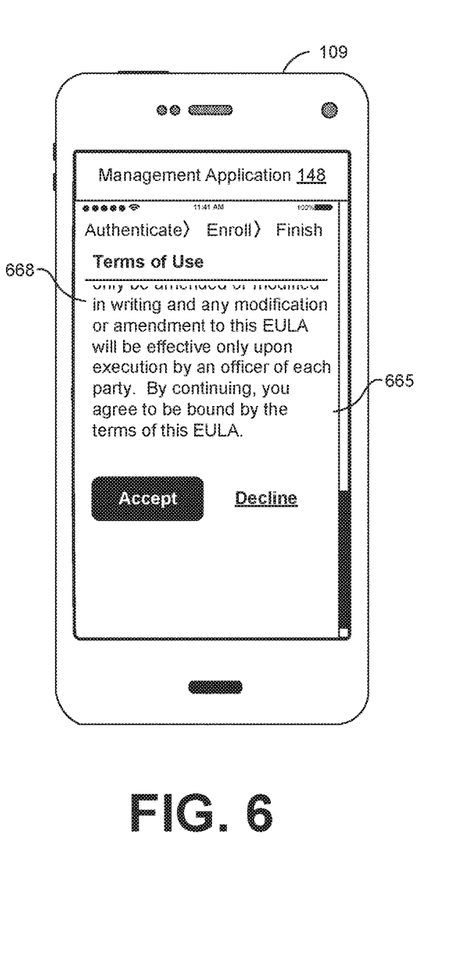
FIG. 6 is an example of a terms of use shown in a user interface rendered on a client device of the networked environment.

FIG. 6 shows a management application 148 causing a user interface 665 to be rendered on the client device 109 of the networked environment 100. A terms of use 668 is rendered in the user interface 665 on the client device 109 through the management application 148. The terms of use 668 can be customized by an enterprise employing the management service 112 based on a number of factors as discussed herein. The terms of use 668 can be an enterprise requirement that must be accepted before a usage restriction of the client device 109 is removed. The management application 148 can be opened or executed in a single application mode or a kiosk mode, for instance, forcing it to be rendered in the foreground, or active at all times. When the management application 148 is launched in a kiosk mode, a user may not have the ability to close the management application 148, minimize it, run it in the background, or render another application in the client device 109. The kiosk mode can also prevent screens of the operating system 140, for example the user interface 260 of FIG. 5, from being accessed. In some embodiments the management application 148 can also be a whitelisted application.

When the management application 148 is a whitelisted application but is not in a kiosk mode, a user may have the ability to close the user interface 665, or run it in the background while accessing the user interface 260 of FIG. 5. However, the restrictions on the client device 109 remain enabled until the terms of use 668 is accepted.

Figure 7:
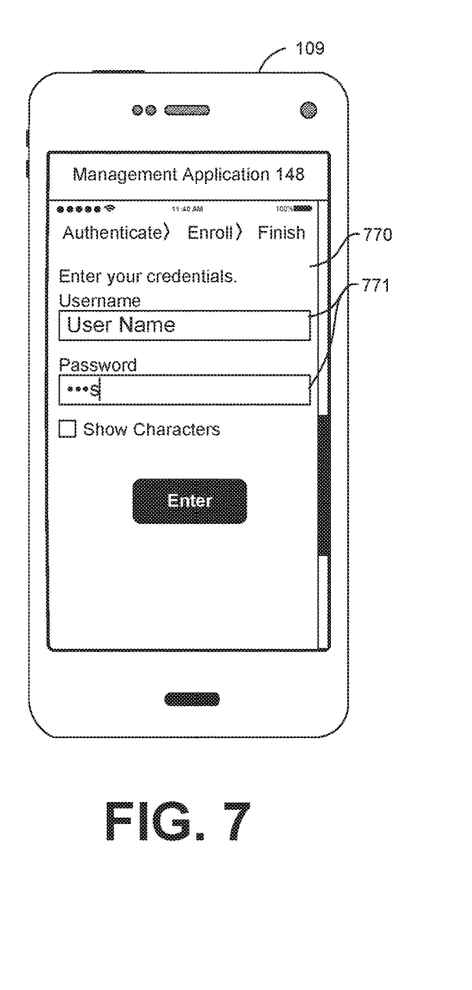
FIG. 7 is an example of authentication in a user interface rendered on a client device of the networked environment.

FIG. 7 shows a management application 148 causing an authentication screen in a user interface 770 to be rendered on the client device 109 of the networked environment 100. The user interface 770 shows form fields 771 to enter credentials including a username and a password using the client device 109. The username and password can be authentication data that is sent to the management service 112. Other credentials can be required such as a PIN, a dongle or physical credential, or a biometric credential. The management application 148 can use an authentication protocol that is not supported by the activation sequence or the registration service 128. For example the management application can use SAML, LDAP, token, or other forms of authentication. Obtaining the authentication data can be an enterprise requirement that must be performed before a usage restriction of the client device 109 is removed.

Figure 8:
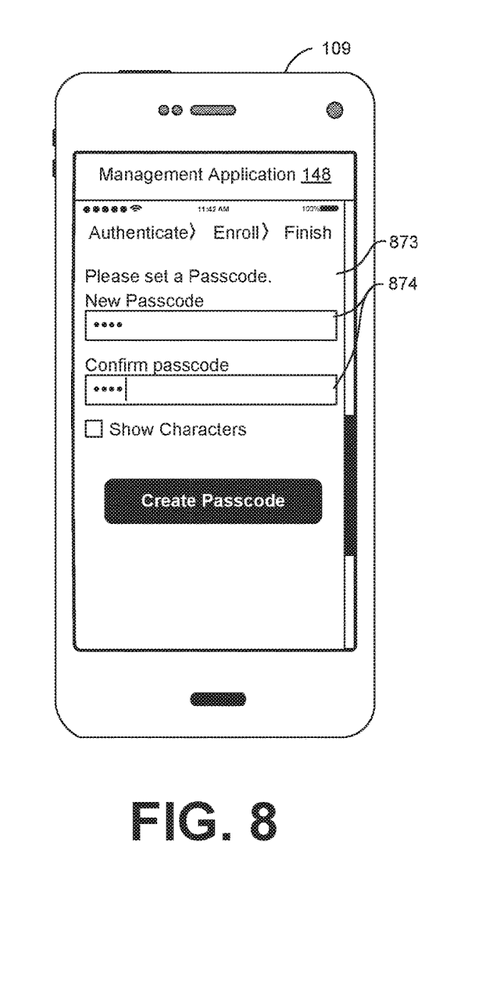
FIG. 8 is an example of passcode creation in a user interface rendered on a client device of the networked environment.

FIG. 8 shows a management application 148 causing a passcode creation screen in a user interface 873 to be rendered on the client device 109 of the networked environment 100. The user interface 873 includes form fields 874 to set or create a passcode using the client device 109. The passcode can be used later to access certain applications or enterprise features. Passcode creation can be an enterprise requirement that must be performed before a usage restriction of the client device 109 is removed.

The client devices 109 or devices comprising the management system 103 can include at least one processor circuit, for example, having a processor and at least one memory device, both of which couple to a local interface, respectively. The client device 109 can include, for example, at least one computer, a mobile device, smartphone, computing device, or like device. The local interface can include, for example, a data bus with an accompanying address/control bus or other bus structure. Stored in the memory device are both data and several components that are executable by the processor. In particular, stored in the one or more memory devices and executable by the device processor can be the client application 149, and potentially other applications. Also stored in the memory can be a data store 115 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the management service 112, the management application 148, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for enforcement of enterprise requirements for a deployment of client devices, comprising:
at least one computing device; and
a data store comprising executable instructions that, when executed by at least one processor, cause the at least one computing device to at least:
receive a device enrollment request that is part of an activation sequence of a client device that is registered with a registration service;
in response to the device enrollment request, transmit, to the client device, a command to install a first profile on the client device, wherein the first profile enforces a whitelist that permits only a management application to be accessed, and prohibits other applications from being accessed;
transmit to the client device, a command to execute the management application on the client device with a kiosk mode enabled to enforce at least one enterprise requirement comprising a user acceptance of a terms of use, wherein the kiosk mode requires the client device to display the management application comprising the terms of use;
identify a completion of the at least one enterprise requirement based on the user acceptance of the terms of use being obtained through the management application; and
in response to the completion of the at least one enterprise requirement for the deployment, transmit, to the client device, a command that causes a second profile to be installed on the client device, the second profile causing the client device to cease enforcing the kiosk mode and the whitelist.

2. The system of claim 1, wherein the instructions, when executed by the at least one processor, further cause the at least one computing device to at least:
cause the management application to obtain authentication data.

3. The system of claim 2, wherein the authentication data comprises at least one of a username, a password, a personal identification number (PIN), biometric data, or a combination thereof.

4. The system of claim 2, wherein the authentication data is obtained through at least one of Security Assertion Markup Language (SAML) based authentication, token based authentication, or directory based authentication.

5. The system of claim 2, wherein the terms of use are determined based at least in part on a user profile associated with the authentication data.

6. The system of claim 1, wherein the instructions, when executed by the at least one processor, further cause the client device to at least:
determine whether the management application initiates a requirement to create a device passcode to access an application, wherein the second profile is installed on the client device.

7. The system of claim 1, wherein the first profile further restricts at least one settings option associated with the client device.

8. A non-transitory computer-readable medium embodying executable instructions for enforcement of enterprise requirements for a deployment of client devices, wherein the instructions, when executed by at least one processor, cause a client device to at least:
transmit, to a management service, a device enrollment request that initiates enrollment of the client device with the management service, the management service being identified in enrollment data that is received from a registration service as part of an activation sequence of the client device;
install a first profile received from the management service in response to the device enrollment request, the first profile comprising a whitelist that permits only a management application to be accessed on the client device, and prohibits other applications from being accessed;
execute a command to run the management application with a kiosk mode enabled to enforce at least one enterprise requirement comprising a user acceptance of a terms of use, wherein the kiosk mode requires the client device to display the management application;
present the terms of use that is rendered by the management application;
identify a completion of the at least one enterprise requirement based on the user acceptance of the terms of use and communicate the completion of the at least one enterprise requirement to the management service; and
install a second profile received from the management service based on the completion of the at least one enterprise requirement for the deployment of client devices, the second profile ceasing to enforce the whitelist and the kiosk mode.

9. The non-transitory computer-readable medium of claim 8, wherein the instructions, when executed by at least one processor, further cause the client device to at least:

obtain user authentication data, wherein the terms of use are determined based at least in part on the authentication data.

10. The non-transitory computer-readable medium of claim 9, wherein the authentication data comprises at least one of a username, a password, a personal identification number (PIN), biometric data, or a combination thereof.

11. The non-transitory computer-readable medium of claim 8, wherein the instructions, when executed by the at least one processor, further cause the client device to at least:
authenticate the client device with the management service using a security assertion markup language (SAML) based authentication.

12. The non-transitory computer-readable medium of claim 8, wherein the instructions, when executed by the at least one processor, further cause the client device to at least:
authenticate the client device with the management service using a lightweight directory access protocol (LDAP) based authentication.

13. The non-transitory computer-readable medium of claim 8, wherein the instructions, when executed by the at least one processor, further cause the client device to at least:
authenticate the client device with the management service using a token based authentication.

14. The non-transitory computer-readable medium of claim 8, wherein the instructions, when executed by the at least one processor, further cause the client device to at least:
present a series of content through a secure content locker application; and
communicate completion of the series of content to the management service.

15. The non-transitory computer-readable medium of claim 8, wherein the terms of use is associated with an enterprise that owns the client device.

16. A computer-implemented method for enforcement of enterprise requirements for a deployment of client devices, the method comprising:
receiving a device enrollment request that is part of an activation sequence of a client device that is registered with a registration service;
in response to the device enrollment request, transmit, to the client device, a command to install a first profile on the client device, the first profile comprising a whitelist that permits only a management application to be accessed on the client device, and prohibits other applications from being accessed;
transmitting, to the client device, a command to execute the management application on the client device in a kiosk mode to enforce at least one enterprise requirement comprising a user acceptance of a terms of use, the kiosk mode requiring the client device to display the management application comprising the terms of use; and
identifying a completion of the at least one enterprise requirement based on the user acceptance of the terms of use that is rendered on the client device by the management application; and
in response to the completion of the at least one enterprise requirement for the deployment, transmitting, to the client device, a command to install a second profile, the second profile causing the client device to cease enforcing the whitelist and the kiosk mode.

17. The computer-implemented method of claim 16, further comprising:
identifying a completion of at least one enterprise requirement that includes identifying the user acceptance of the terms of use.

18. The computer-implemented method of claim 17, wherein identifying the completion of the at least one enterprise requirement further includes identifying a presentation of a series of content through a secure content locker application.

19. The computer-implemented method of claim 17, wherein identifying the completion of the at least one enterprise requirement further includes identifying an authentication using at least one of Security Assertion Markup Language (SAML) based authentication, token based authentication, or directory based authentication.

20. The computer-implemented method of claim 17, wherein identifying the completion of the at least one enterprise requirement further includes obtaining authentication data comprising at least one of a username, a password, a personal identification number (PIN), or biometric data.

* * * * *